(12) United States Patent
Thomas (10) Patent No.: US 9,199,743 B2
(45) Date of Patent: Dec. 1, 2015

(54) CONTROL SURFACE ELEMENT SKEW AND / OR LOSS DETECTION SYSTEM (75) Inventor: Glynn Thomas, Staffordshire (GB)

(73) Assignee: MOOG WOLVERHAMPTON LIMITED, Wolverhampton (GB)

( * ) Notice: Subject to any disclaimer, the term of this patent is extended or adjusted under 35 U.S.C. 154(b) by 325 days.

(21) Appl. No.: 13/637,083

(22) PCT Filed: Mar. 23, 2011

(86) PCT No.: PCT/GB2011/050573
§ 371 (c)(1),
(2), (4) Date: Dec. 4, 2012

(87) PCT Pub. No.: WO2011/124904
PCT Pub. Date: Oct. 13, 2011

(65) Prior Publication Data
US 2013/0068893 A1 Mar. 21, 2013

(30) Foreign Application Priority Data
Apr. 9, 2010 (GB) .................................. 1005966.5

(51) Int. Cl.
B64C 3/38 (2006.01)
B64D 45/00 (2006.01)
B64C 13/28 (2006.01)

(52) U.S. Cl.
CPC .............. *B64D 45/0005* (2013.01); *B64C 13/28* (2013.01); *B64D 2045/001* (2013.01)

(58) Field of Classification Search
CPC ............ B64C 13/28; B64C 9/22; B64C 9/16; B64C 13/30; Y02T 50/44; B64D 45/0005; B64D 2045/001

USPC .............. 244/99.3, 99.2, 232, 233, 228, 213, 244/76 A, 89, 90 R, 1 R, 217
See application file for complete search history.

(56) References Cited

U.S. PATENT DOCUMENTS

| 3,169,178 | A | * | 2/1965 | Notchev et al. ............. 200/61.46 |
| 3,935,754 | A | * | 2/1976 | Comollo ....................... 74/665 F |
| 4,181,276 | A | * | 1/1980 | Kogure et al. ................. 244/215 |
| 4,287,788 | A | * | 9/1981 | Baetke ....................... 74/501.5 R |
| 4,776,543 | A | * | 10/1988 | Stableford ..................... 244/232 |
| 5,628,477 | A | * | 5/1997 | Caferro et al. .................. 244/214 |
| 5,680,124 | A | * | 10/1997 | Bedell et al. ................... 340/945 |
| 5,686,907 | A | * | 11/1997 | Bedell et al. ................... 340/945 |
| 6,299,108 | B1 | * | 10/2001 | Lindstrom et al. ............. 244/213 |
| 6,466,141 | B1 | * | 10/2002 | McKay et al. ................. 340/963 |
| 8,115,649 | B2 | * | 2/2012 | Moy et al. ................... 340/686.1 |
| 8,152,110 | B2 | * | 4/2012 | Schlegel et al. ............... 244/233 |
| 2004/0036477 | A1 | * | 2/2004 | Schievelbusch et al. ...... 324/522 |
| 2004/0056147 | A1 | * | 3/2004 | Uchida et al. ................... 244/10 |

(Continued)

FOREIGN PATENT DOCUMENTS

DE 102007046707 4/2009
EP 0726201 8/1996

(Continued)

*Primary Examiner* — Tien Dinh
*Assistant Examiner* — Assres H Woldemaryam
(74) *Attorney, Agent, or Firm* — Hodgson Russ LLP (57) ABSTRACT A control surface element skew and/or loss detection system (100) is provided which combines a cable (168, 178) system linked to movement transducers (120) via mechanical links (114, 116) connecting the fixed wing structure (102) to the control surface elements (106, 112).

12 Claims, 4 Drawing Sheets

(56) References Cited

U.S. PATENT DOCUMENTS

2007/0051183 A1* 3/2007 Schievelbusch ............... 73/800
2008/0265090 A1* 10/2008 Schievelbusch ............ 244/99.3

FOREIGN PATENT DOCUMENTS

| EP | 1088753 | 10/2002 |
| EP | 1982916 | 10/2008 |

* cited by examiner

CONTROL SURFACE ELEMENT SKEW AND / OR LOSS DETECTION SYSTEM

FIELD OF THE INVENTION

The present invention is concerned with a control surface element skew and/or loss detection system. More specifically, the present invention is concerned with a cable-type skew and/or loss detection system for use with slats and flaps of aircraft wings.

BACKGROUND OF THE INVENTION

Aircraft wings typically comprise a series of actuable control surface elements. These control surface elements define control surfaces (also known as auxiliary aerofoils) which are moveable relative to the fixed wing structure in order to alter the aerodynamic characteristics of the wing. Such control surface elements include leading edge devices such as slats, and trailing edge devices such as flaps.

Typically, control surface elements are actuated at either span-wise end by two separate actuators. It is conceivable that if either of these actuators malfunctions, inconsistent actuation and skew or loss of the relevant control surface could occur. It is important that if skew or loss is detected, the relevant systems are shut down and the pilot of the aircraft is notified.

Various methods have been proposed in the prior art for providing detection of skew and/or loss of control surface elements. One such system described in U.S. Pat. No. 5,680,124 proposes a cable which is coupled to each of a series of control surface elements. The cable is put in tension in the event of skew or loss. A movement detector with a proximity sensor is provided coupled to the cable such that any movement of the cable resulting from skew and/or loss can be detected. This detector is mounted on the endmost flap or slat. It is coupled to the flap/slat electronics unit (FSEU) in the aircraft fuselage via electric cables running from the moveable control surface element through the fixed wing structure into the fuselage and to the FSEU.

This system detects skew by differential motion of adjacent surface elements which acts to pull the cable. A first problem with this system is that because the cable must be anchored at the endmost control surface elements, skew of those elements cannot be easily detected by this system. For example, if the endmost surface drive mechanism fails to move, this will not necessarily result in differential motion between the endmost surface and the next surface.

A further problem with this prior art system is that wiring needs to be routed between the moveable control surface element on which the detector is mounted to and the fixed wing structure. Translating wiring between a moveable structure and a fixed structure is undesirable as wear and fatigue can occur. Furthermore, such wiring will be exposed to, and subject to, damage by external elements.

In addition, leading edge control surface elements such as slats need to have anti-icing features. Such features generate a range of adverse temperature conditions which can affect the performance and reliability of the cable pull detector mounted on these control surface elements.

A further problem with the prior art system is that the moveable control surface element is usually an enclosed panel, making access to the sensor difficult for maintenance.

A still further problem with the prior art system is that a broken cable can not be detected. If the cable is broken then the skew or loss can no longer be detected which compromises the safety of the system. A check is therefore required at regular intervals to verify the cable is intact. This is a manual operation which adds maintenance time, cost and administration effort.

SUMMARY OF THE INVENTION

It is an aim of the present invention to overcome or at least mitigate one or more of the above problems.

According to the invention there is provided an aircraft control surface element skew and/or loss detection system comprising an aircraft wing structure comprising a fixed part, a first control surface element and a second control surface element, the elements configured to be movable relative to the fixed part, a cable coupled to each of the first and second control surface elements such that a tensile force is applied to the cable upon skew and/or loss of one of the control surface elements, a mechanical link having a first end connected to the fixed wing structure, and a second end movably mounted to the first control surface element, a movement transducer configured to detect articulation of the mechanical link, wherein a first end of the cable is connected to the second end of the mechanical link such that skew and/or loss of one of the control surface elements causes articulation of the mechanical link by movement of the second end of the link relative to the first control surface element.

The aircraft control surface elements may be any type of controls surface, preferably high lift surfaces such as slats or flaps.

By "mechanical link" we mean a structure capable of being articulated such as a multi-bar linkage, telescopic rod, strut or the like. Because the mechanical link is mounted between the fixed wing structure and a control surface element (usually one of the end control surface elements), unexpected movement of that element can be directly detected via the link and, as such, none of the control surface elements will be exempt from skew and/or loss detection.

In addition, because only a mechanical link is required between the first control surface element and the fixed part, no electronics or wiring is required to span the control surface element and the fixed wing structure. As such, the above mentioned disadvantages of such wiring can be avoided.

Because the movement transducer is situated on a fixed wing structure it can be appropriately shielded and/or shrouded. It can also be made easily accessible for service and/or repair. Because the movement transducer is situated on a fixed wing structure it can be located away from the anti-icing area with its associated temperature extremes.

Preferably the detection system comprises a cable loss detection system configured to detect a cable tension less than a predetermined amount. More preferably the cable loss detection system is configured to cause articulation of the mechanical link upon detection of a cable tension less than the predetermined amount. In this way the same transducer can be used to detect loss in cable tension.

Preferably the cable loss detection system comprises a resilient element disposed between the second end of the link and the first control surface element, which resilient element acts in opposition to cable tension such that in the event that the cable tension drops below the force of the resilient element the second of the link moves relative to the first control surface element.

Preferably the cable loss detection system is arranged to articulate the mechanical link in a direction opposite to the direction of articulation in the event of loss or skew of one of the control surface elements.

BRIEF DESCRIPTION OF THE DRAWING VIEWS

An example skew and/or loss detection system according to the present invention will now be described with reference to the accompanying drawings in which.

DETAILED DESCRIPTION OF THE INVENTION

Figure 1:
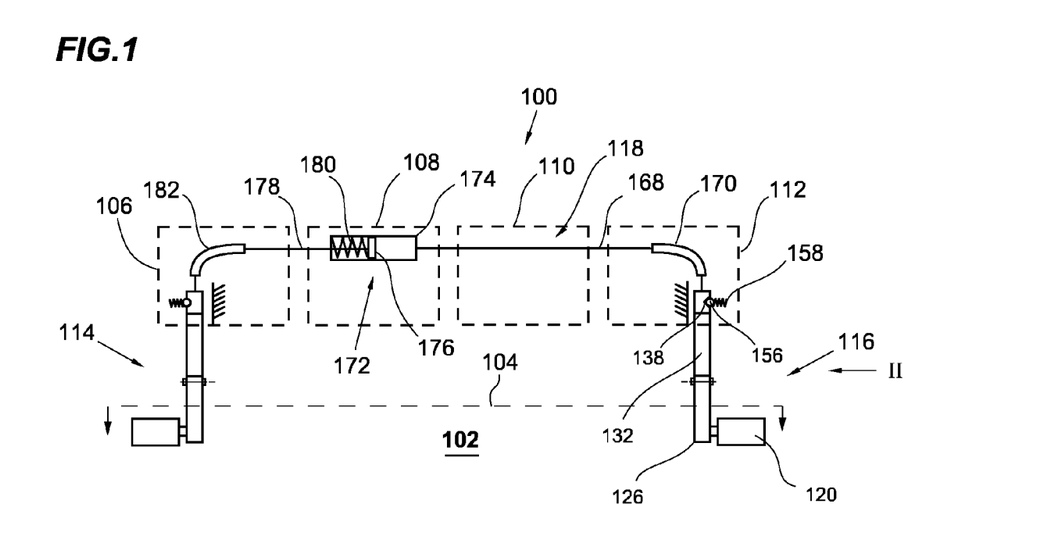
FIG. 1 is a schematic plan view of a first skew and/or loss detection system according to the present invention installed on the leading edge of an aircraft wing.

Referring to FIG. 1, a control surface element skew and/or loss detection system 100 is shown schematically. The system is shown installed on a fixed wing structure 102 having a leading edge 104. A plurality of control surface elements in the form of first slat 106, a second slat 108, a third slat 110 and a fourth slat 112 are independently moveably mounted to the fixed wing structure 102. The method of attachment and actuation of the slats 106, 108, 110, 112 is well known in the art and will not be described further here. The overall position of the slat system is indicated by a system movement transducer, typically located at the endmost position one each wing.

The skew and/or loss detection system 100 comprises a first link assembly 114, a second link assembly 116 and a cable assembly 118. The first link assembly 114 and the second link assembly 116 are substantially identical and connect the outermost part of the first slat 106 (distal to the fuselage) and the innermost part of fourth slat 112 (proximal to the fuselage) respectively to the fixed wing structure. Only the second link assembly 116 will be described in detail here although it will be understood that the first link assembly 114 operates in the same manner.

Figure 2:
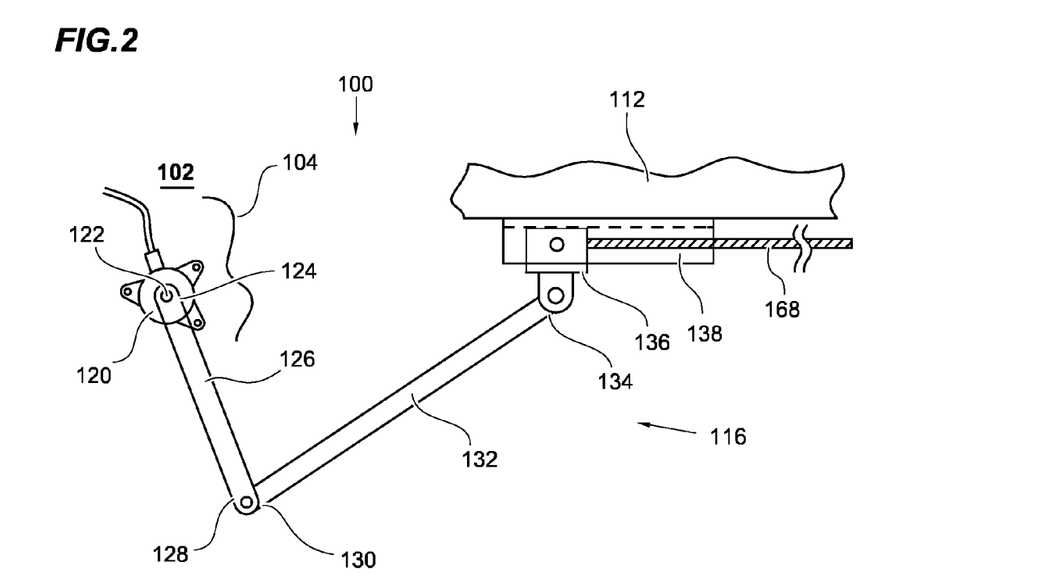
FIG. 2 is a side schematic view of the system of FIG. 1 in direction II.

Turning to FIG. 2, the second link assembly 116 is shown in detail. A rotary movement transducer 120 such as a rotary variable differential transformer (RVDT) is attached to the fixed wing structure 102. A rotary input shaft 122 to the transducer 120 is connected to the first end 124 of a first link arm 126. As such, the first link arm 126 can rotate about its first end 124 on the input shaft 122 of the transducer 120. The rotary movement transducer 120 can therefore detect any rotational movement of the first link arm 126. A second end 128 of the first link arm 126 is pivotally connected to a first end 130 of a second link arm 132 such that the second link arm 132 can rotate about its first end 130 relative to the first link arm 126. A second end 134 of the second link arm 132 is pivotally attached to a slider element as will be described below.

Figure 3:
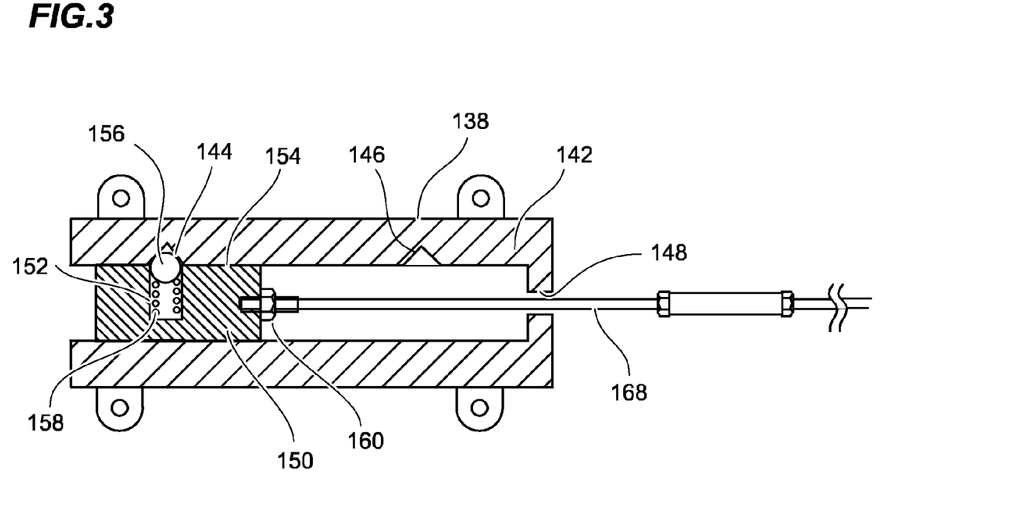
FIG. 3 is a close-up section view of a part of the skew and/or loss detection system shown in FIGS. 1 and 2.
Figure 4:
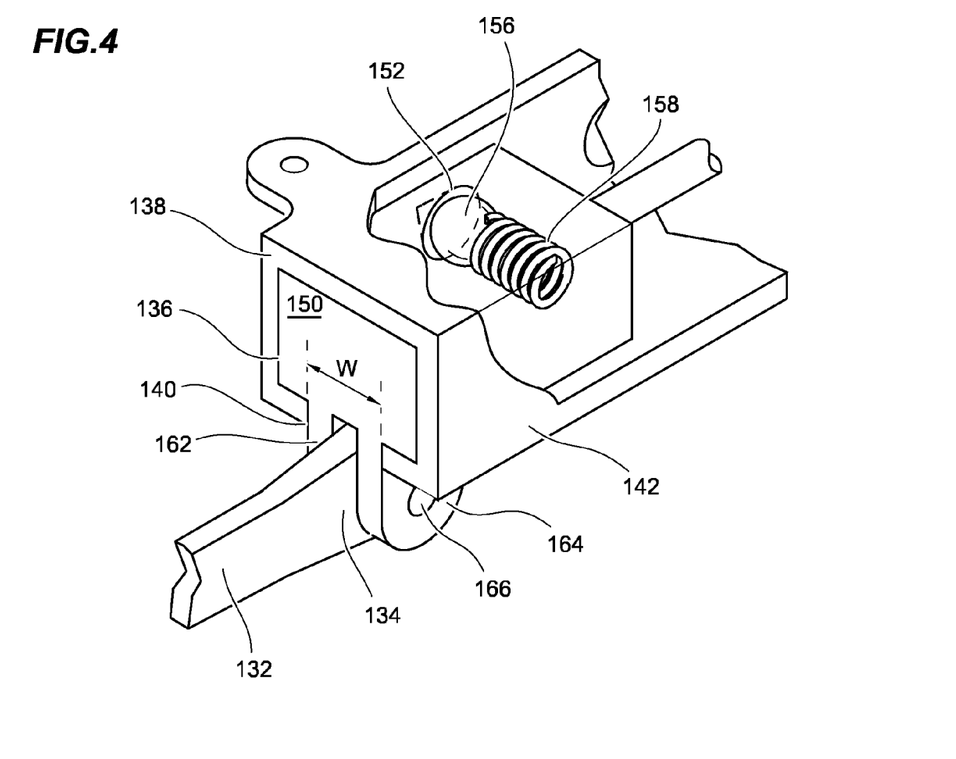
FIG. 4 is a partially cut-away view of the part of the skew and/or loss detection system shown in FIG. 3.

The second link assembly 116 further comprises a slider track 138 mounted to the fourth slat 112. Referring to FIGS. 3 and 4, the slider track 138 is a hollow, generally rectangular prism defining a hollow cavity and a lower slot 140, the function of which will be described below. The slot 140 extends substantially all the way along the length of the track 138 and has a width W substantially less than the width of the cavity of the track 138. A first side wall 142 of the track 138 comprises a first detent 144 and a second detent 146 longitudinally spaced along the track 138. At the end of the track 138, a cable guide slot 148 is formed in the end wall.

The slider element 136 comprises a rectangular body 150 which is slidable within the cavity of the track 138. The rectangular body 150 comprises a blind bore 152 extending from a side wall 154. The blind bore 152 contains a ball bearing 156 which is resiliently biased outwardly by a compression spring 158 within the blind bore 152. In the position shown in FIG. 3, the ball bearing 156 is urged into the first detent 144 such that the slider element 136 is held stationary relative to the track 138.

The slider element 136 further comprises a cable attachment formation 160, the function of which will be described below.

The slider element 136 further comprises a first extending plate 162 and a second parallel link arm mounting plate 164. The plates 162, 164 extend through the slot 140 in the track 138. The plates 162, 164 define concentric through bores 166 through which a pin is passed in order to pivotably connect the second end 134 of the second link arm 132 therebetween. As such, the second link arm 132 is pivotably mounted to the slider element 136.

It will be noted that upon movement of the fourth slat 112 relative to the fixed wing structure 102, the second link assembly 116 will articulate causing the link arms 126, 132 to rotate relative to each other and relative to the rotary movement transducer 120. As such, during normal motion of the fourth slat 112, detection of a movement at the rotary movement transducer 120 is to be expected. The motion recorded at the system movement transducer can be compared to the movement detected by the rotary movement transducer. Any discrepancy (e.g. excessive movement) will indicate skew or loss as will be described below.

Turning to the cable assembly 118, a substantially inextensible first cable portion 168 is provided and is attached to the cable attachment formation 160 of the slider element 136. The first cable portion 168 passes through the cable slot 148 to a cable turn guide 170 in the fourth slat 112. The first cable portion 168 is thereby turned through 90 degrees to extend parallel to the leading edge 104. The first cable portion 168 then passes through the third slat 110 to the second slat 108. It will be noted that the first cable portion 168 is coupled to the slats so as to be axially moveable relative thereto and in such a way that it can be tensioned by movement caused by skew or loss of the slat. For example, the first cable portion 168 could be encased within a guide sleeve passing through the slat structure.

When the first cable portion 168 reaches the second slat 108 it is coupled to a lost motion device 172. The lost motion device 172 comprises a cylinder 174 in which a piston 176 is slidably moveable. The first cable portion 168 is connected to the cylinder 174. The piston 176 is connected to a second cable portion 178 such that relative movement between the first cable portion 168 and the second cable portion 178 is permitted by sliding motion of the piston 176 in the cylinder 174. The piston 176 is biased by a compression spring 180 such that the ends of the cable portions 168, 178 are urged together. The lost motion device 172 accounts for any acceptable motion of the cable due to known factors in normal use such as expansion and contraction due to changes in ambient temperature and normal wing deflection during use. A rigging window is provided in the lost motion device such that it can be easily set during assembly.

The second cable portion 178 continues through a second cable guide 182 mounted on the first slat 106. The second cable guide 182 turns the cable 178 through 90 degrees such that it is perpendicular to the leading edge 104. The second part of the cable 178 terminates at a cable attachment formation in the first link assembly 114 which will not be described here in detail.

In use, the system operates as follows:

Normal variations in the length of the cable between the first and second link assemblies 114, 116 is accounted for by the lost motion device 172. As such, any tension on the cable due to normal thermal and/or wing deflection effects will be accounted for by the lost motion device.

For more severe events such as flap skew or loss, the lost motion device 172 will "bottom out". Specifically, the compression spring 180 will be fully compressed and the piston 176 will reach the end of the cylinder 174. When this occurs, a tensile force is applied to the cable attachment formations 160 of the slider elements 136 in the link assemblies 114, 116. Turning to FIG. 3, such a force will cause the ball bearing 156 to exit the first detent 144 by compressing the spring 158. The slider element 136 will then be free to move relative to the fourth slat 112. It will be understood that this may also occur at the first link assembly 114 depending on the nature of the skew and/or loss event.

This causes the link arms 126, 132 to rotate relative to one another and such articulation to be detected at the rotary movement transducer 120. As such, by comparing the expected output of the rotary movement transducer 120 (e.g. from the slat actuation system) and the actual output, any skew or loss can be detected as unexpected or excessive movement and articulation of the first link assembly 114 has occurred.

Once the slider element 136 has reached the end of the track 138 proximate the cable guide slot 148, the ball bearing 156 will enter the second detent 146 under the resilient force of the spring 158. This ensures that should the skew and/or loss be sufficient to break the cable 168, 178 the slider element 136 will remain in the skew and/or loss detection position without returning back to its normal position. The skew and/or loss therefore remains detectable until the system is reset by maintenance personnel.

It will be noted that advantageously the skew and/or loss is detected at two positions in the wing assembly, notably the first and last slats in the plurality. As such, skew and/or loss is reliably detected with redundancy.

Figure 5:
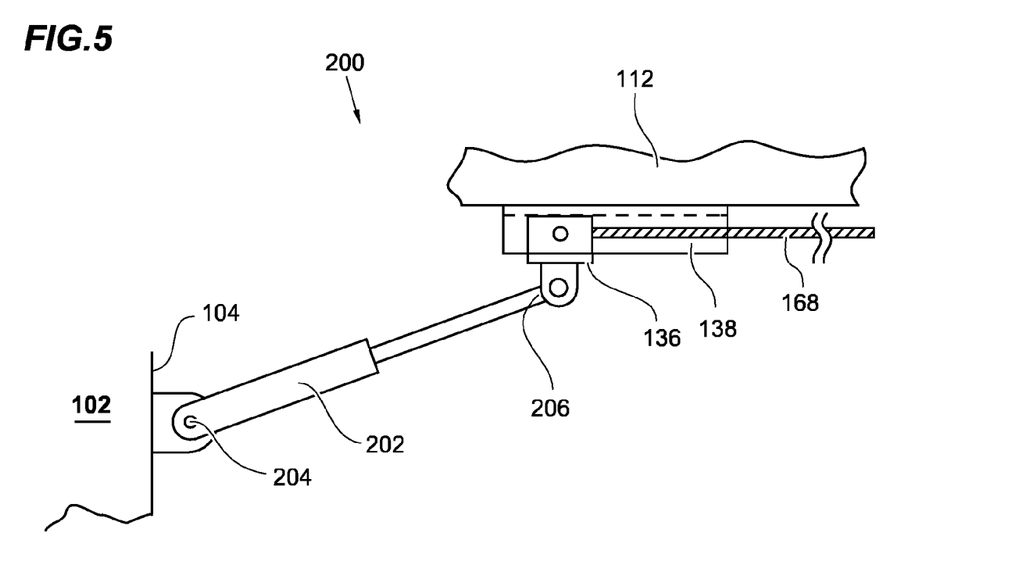
FIG. 5 is a side schematic view of a second skew and/or loss detection system according to the present invention installed on the leading edge of an aircraft wing.

Turning to FIG. 5, a second skew and/or loss detection system 200 is shown. Reference numerals of common features are identical to the system 100.

In the system 200, the rotary movement transducer 120 has been replaced by a linear movement transducer (e.g. an LVDT) 202. The linear movement transducer determines changed in it's length and is configured to report these changes to the aircraft control systems (not shown).

The transducer 202 is in the form of an extensible strut which is pivotably mounted to the fixed wing structure 102 at a first end 204 and pivotably mounted to the slider element 136 at a second end 206. Upon regular movement of the fourth slat 112 during use, the length of the transducer 202 changes. The length change reported by the transducer 202 is compared with an expected change in length given the expected movement of the fourth flap 112 following actuation. A significant difference between the reported change in length and the expected value is indicative of a skew or loss event.

Figure 6:
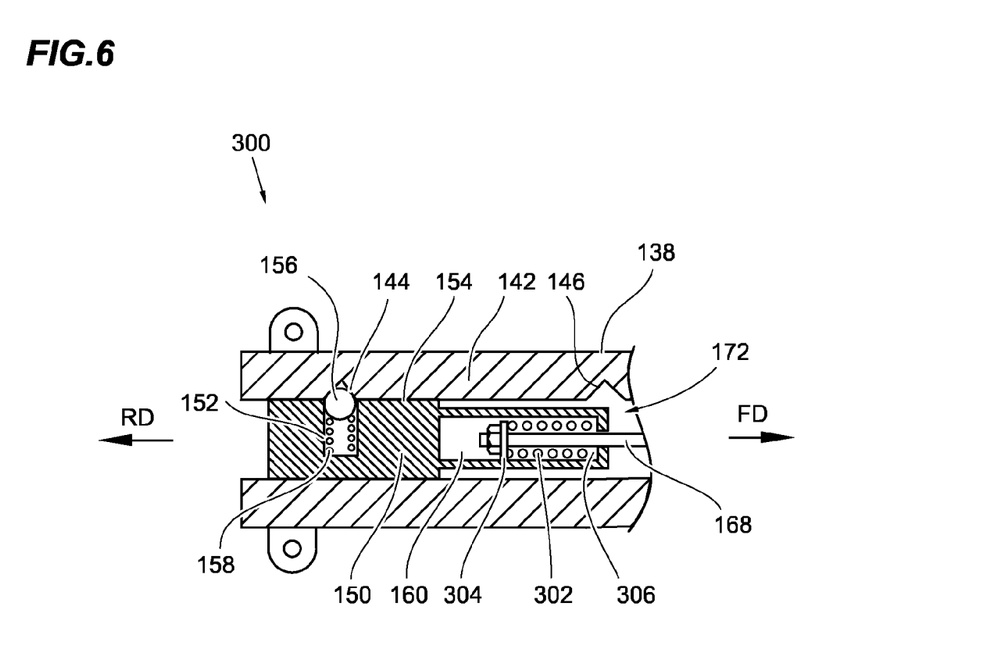
FIG. 6 is a close-up section view of a part of a third skew and/or loss detection system according to the present invention from an underside of a slat.

Turning to FIG. 6, a part of the third skew and/or loss detection system 300 is shown. The system is viewed from underneath the slat panel (not shown), and is in section. Forward (FD) and rearward (RD) directions of the wing are labelled. Reference numerals of common features are identical to the system 100. In particular a part of the second link assembly including the slider element 136 and track 138 is shown.

In the skew and/or loss detection system 300, the lost motion device 172 is incorporated attaching the first cable portion 168 to the slider element 136. The lost motion device 172 works in substantially the same manner as in system 100 having a compression spring 302 disposed between a shoulder 304 at the end of the first cable portion 168 and a shoulder 306 defined on the slider 136.

Figure 7:
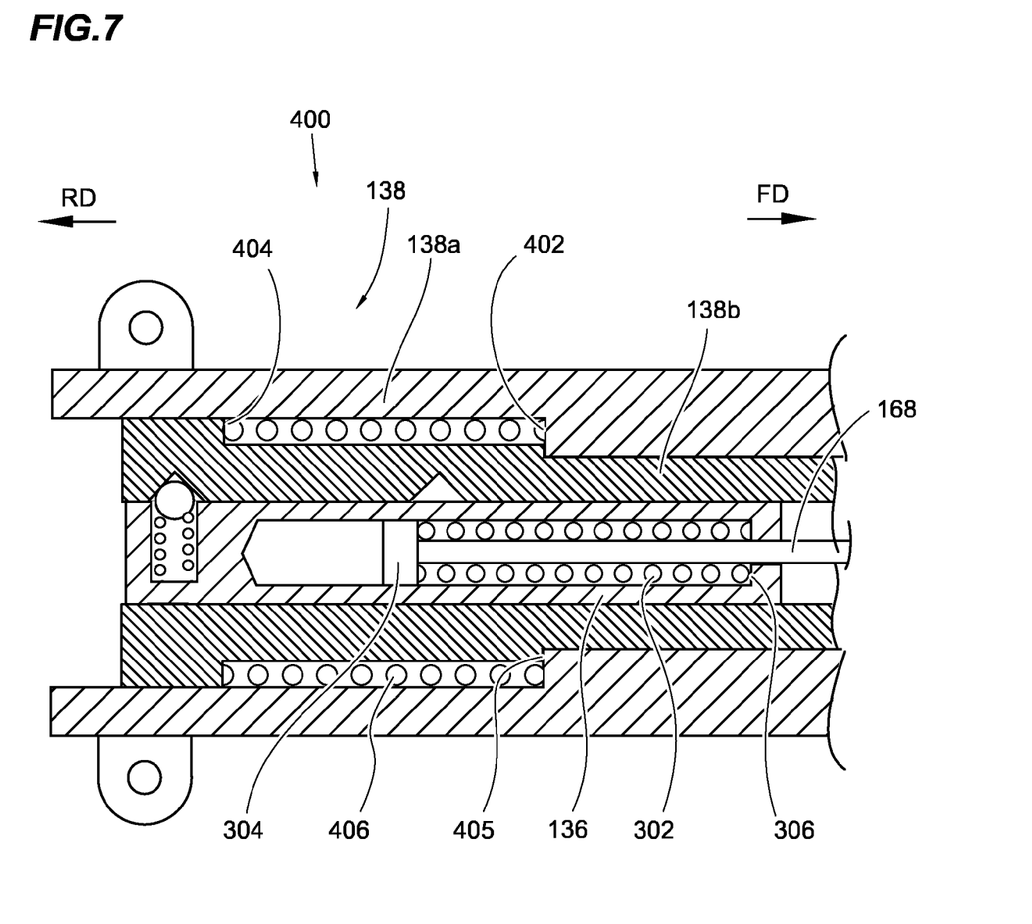
FIG. 7 is a close-up section view of a part of a fourth skew and/or loss detection system according to the present invention from an underside of a slat.

Turning to FIG. 7, a part of a fourth skew and/or loss detection system 400 is shown. The system is viewed from underneath the slat panel (not shown), and is in section. Forward (FD) and rearward (RD) directions of the wing are labelled. Reference numerals of common features are identical to the system 300. The system 400 is similar to the system 300 with the exception of the construction of the track 138.

In the fourth system 400, the track 138 comprises an outer track component 138a and an inner track component 138b. The outer track component 138a comprises a rearward facing shoulder 402 which faces rearward to the leading edge of the wing where the slat is attached. The inner track component 138b is slidably engaged within the outer track component 138a and comprises a first forward facing shoulder 404 and a second forward facing shoulder 405 both of which face the rearward facing shoulder 402.

A compression spring 406 is disposed between the shoulders 402, 404 which act as spring abutments, the spring 406 acting to urge the track components 138a, 138b (and the shoulders 402, 405) apart. In normal use, the spring 406 is compressed and the rearward facing shoulder 402 is in contact with the second forward facing shoulder 405.

The spring 302 is selected to have a higher preload than the spring 406, and as such as long as a pull force is applied to the cable 168 (as is the case in normal use), the spring 406 will be compressed first (to its minimum length) to urge shoulders 402, 405 together.

The system 400 is designed to provide an alert if any part of the cable snaps, thus removing all tensile force. In this instance, the springs 302 and 406 will extend, and out-of-range motion will be detected by the associated displacement transducer because the slider 136 will move relative to the slat to which the outer track component 138a is attached (carried by the inner track component 138b).

Because a flap skew events always acts to increase the tension on the cable (not decrease it), cable tension loss may be differentiated from a skew event because the slider (and hence the movement transducer) will be moved in the opposite direction. In the embodiment of FIG. 2, a skew event will act to rotate the link 126 counter clockwise about the shaft 122. On the other hand, if the system 400 is employed with cable loss detection, loss in cable tension (due to the cable snapping or failing) will act to rotate the link 126 clockwise. Such movements can be differentiated to determine whether the out-of-range reading by the RVDT 120 is due to flap skew or cable tension loss, which may be a result of flap loss or mechanical failure in the cable. It will be noted that in either given situation, the system will have to be shut down. The main benefit is in diagnosis of the failure mode.

Variations fall within the scope of the present invention.

Skew and/or loss of one of any number of surfaces can be detected with the aforementioned invention.

The lost motion device can be positioned in any of the surfaces or (per system 300) within the slider element/track mechanism.

Alternative slider and detent mechanisms may be employed, providing a certain degree of linear motion is permitted between the mechanical link, which motion is initiated at a predetermined cable tension load.

A lost motion device may be incorporated into the slider mechanism at each end—i.e. half of the lost motion of the system can be accounted for by two arrangements, one at the track of the first link and one at the track of the second link. Installation of the cable through the surfaces is simplified and inspection and checking of the system is made easier.

The RVDT may be replaced with any suitable rotary sensor such as but not limited to a potentiometer or resolver.

As an alternative to the output from the RVDT being compared to the expected output due to motion of the flaps in use, the left wing RVDT output may be compared to the right wing PVDT output. Because aircraft flaps are actuated symmetrically, any undesired skew on one of the wings compared to the other will be detected by a significant difference in RVDT output.

The invention is equally applicable to flaps (trailing edge) as well as slats (leading edge).

What is claimed is:

1. An aircraft control surface element skew and/or loss detection system comprising:
    an aircraft wing structure comprising a fixed part, a first control surface element and a second control surface element, wherein the first control surface element and the second control surface element are configured to be movable relative to the fixed part,
    a cable coupled to each of the first and second control surface elements such that a tensile force is applied to the cable upon skew and/or loss of one of the first and second control surface elements,
    a mechanical link having a first end mounted to the fixed part of the aircraft wing structure, and a second end movably mounted to the first control surface element,
    a movement transducer configured to detect articulation of the mechanical link,
    wherein a first end of the cable is connected to the second end of the mechanical link such that skew and/or loss of one of the control surface elements causes articulation of the mechanical link by movement of the second end of the mechanical link relative to the first control surface element,
    wherein the movement transducer is a rotary transducer connected to a first pivotable arm of the mechanical link, and
    wherein the mechanical link comprises a linkage comprising the first pivotable arm, and a second pivotable arm pivotably connected to the first pivotable arm and pivotably connected to the first control surface member at the second end of the mechanical link.

2. The aircraft control surface element skew and/or loss detection system according to claim 1 in which the movement transducer is mounted to the fixed part of the aircraft wing structure.

3. An aircraft control surface element skew and/or loss detection system comprising:
    an aircraft wing structure comprising a fixed part, a first control surface element and a second control surface element, wherein the first control surface element and the second control surface element are configured to be movable relative to the fixed part,
    a cable coupled to each of the first and second control surface elements such that a tensile force is applied to the cable upon skew and/or loss of one of the first and second control surface elements,
    a mechanical link having a first end pivotally mounted to the fixed part of the aircraft wing structure, and a second end pivotally and movably mounted to the first control surface element, wherein the second end of the mechanical link is connected to the first control surface element via a sliding joint,
    a movement transducer configured to detect articulation of the mechanical link,
    wherein a first end of the cable is connected to the second end of the mechanical link such that skew and/or loss of one of the control surface elements causes articulation of the mechanical link by movement of the second end of the mechanical link relative to the first control surface element,
    wherein the sliding joint inhibits linear motion of the second end of the mechanical link relative to the first control surface element below a predetermined tension in the cable.

4. The aircraft control surface element skew and/or loss detection system according to claim 3 in which the movement transducer is a linear transducer connected to a link arm.

5. The aircraft control surface element skew and/or loss detection system according to claim 3 in which the sliding joint comprises:
    a first member connected to the second end of the mechanical link,
    a second member connected to the first control surface element,
    in which the first member is slidable relative to the second member,
    the sliding joint further comprising a resiliently biased member projecting from one of the first and second members engaged with a detent on the other of the first and second members.

6. The aircraft control surface element skew and/or loss detection system according to claim 5 comprising an over-travel detent in the other of the first and second members configured to be engaged by the resiliently biased member in the event of a skew and/or loss event.

7. The aircraft control surface element skew and/or loss detection system according to claim 1 comprising a cable loss detection system configured to detect a cable tension less than a predetermined amount.

8. The aircraft control surface element skew and/or loss detection system according to claim 7 in which the cable loss detection system is configured to cause articulation of the mechanical link upon detection of a cable tension less than the predetermined amount.

9. The aircraft control surface element skew and/or loss detection system according to claim 8 in which the cable loss detection system comprises a resilient element disposed between the second end of the mechanical link and the first control surface element, wherein the resilient element acts in opposition to cable tension such that in the event that the cable tension drops below the force of the resilient element the second end of the mechanical link moves relative to the first control surface element.

10. The aircraft control surface element skew and/or loss detection system according to claim 8 in which the cable loss detection system is arranged to articulate the mechanical link in a direction opposite to the direction of articulation in the event of skew of one of the control surface elements.

11. An aircraft control surface element skew and/or loss detection system comprising:
- an aircraft wing structure comprising a fixed part, a first control surface element and a second control surface element, wherein the first control surface element and the second control surface element are configured to be movable relative to the fixed part,
- a cable coupled to each of the first and second control surface elements such that a tensile force is applied to the cable upon skew and/or loss of one of the first and second control surface elements,
- a mechanical link having a first end pivotally mounted to the fixed part of the aircraft wing structure, and a second end pivotally and movably mounted to the first control surface element,
- a movement transducer configured to detect articulation of the mechanical link,
- wherein a first end of the cable is connected to the second end of the mechanical link such that skew and/or loss of one of the control surface elements causes articulation of the mechanical link by movement of the second end of the mechanical link relative to the first control surface element,
- wherein the aircraft wing structure comprises a third control surface element on an opposite side of the first control surface element to the second control surface element,
- in which a further mechanical link is provided having a first end connected to the fixed part of the aircraft wing structure, and a second end movably mounted to the third control surface element,
- a further movement transducer is provided and configured to detect articulation of the further mechanical link,
- wherein a second end of the cable is connected to the second end of the further mechanical link such that skew and/or loss of one of the first, second, and third control surface elements causes articulation of the further mechanical link by movement of the second end of the further mechanical link relative to the third control surface element.

12. An aircraft control surface element skew and/or loss detection system comprising:
- an aircraft wing structure comprising a fixed part, a first control surface element and a second control surface element, wherein the first control surface element and the second control surface element are configured to be movable relative to the fixed part, the fixed part having a leading edge extending in a span direction of the aircraft wing structure;
- a cable coupled to each of the first and second control surface elements such that a tensile force is applied to the cable upon skew and/or loss of one of the first and second control surface elements, the cable comprising a first cable portion and a second cable portion;
- a lost motion device connecting the first cable portion to the second cable portion, the lost motion device being arranged to extend and act along the span direction to permit limited relative movement between the first cable portion and the second cable portion;
- a mechanical link having a first end pivotally mounted to the fixed part of the aircraft wing structure, and a second end pivotally and movably mounted to the first control surface element,
- a movement transducer configured to detect articulation of the mechanical link,
- wherein a first end of the cable is connected to the second end of the mechanical link such that skew and/or loss of one of the control surface elements causes articulation of the mechanical link by movement of the second end of the mechanical link relative to the first control surface element.

* * * * *